United States Patent
Brennan et al.

[11] 3,725,922
[45] Apr. 3, 1973

[54] CONVERGENCE RATE IMPROVEMENT FOR ADAPTIVE RECEIVING ARRAY ANTENNAS OF HIGHER ORDER THAN 2-PULSE MTI CANCELLERS

[75] Inventors: Lawrence E. Brennan, Tarzana; Irving S. Reed, Santa Monica, both of Calif.

[73] Assignee: Technology Service Corporation, Santa Monica, Calif.

[22] Filed: Sept. 13, 1971

[21] Appl. No.: 179,782

[52] U.S. Cl. .................................. 343/7 A, 343/7.7
[51] Int. Cl. ............................................. G01s 9/42
[58] Field of Search ........................ 343/7 A, 7.7

[56] References Cited

UNITED STATES PATENTS 3,417,396  12/1968  Stifter et al. ........................ 343/7.7
3,587,097  6/1971  Stull ................................... 343/7 A

*Primary Examiner*—T. H. Tubbesing
*Attorney*—Lindenberg, Frilich & Wasserman

[57] ABSTRACT

A system for improving the convergence rate of adaptive receiving array antenna systems in MTI radar systems, having cancellers of higher orders than a 2-pulse canceller, is provided by a transformation matrix according to the following technique.

Form the matrix H with elements $$H_{mn} = 1 - \epsilon |m - n|^2$$

where $\epsilon = \log 1/\rho$ and $\rho$ is the correlation between successive returns. The transformation matrix then has the form $$U = \begin{bmatrix} GFAC & 0 & 0 & \cdots & 0 \\ 0 & 1 & 0 & \cdots & 0 \\ 0 & 0 & 1 & \cdots & 0 \\ \vdots & \vdots & \vdots & & \vdots \\ 0 & 0 & 0 & \cdots & 1 \end{bmatrix} U_1 \begin{bmatrix} 1 & 0 & 0 & \cdots & 0 \\ 0 & e^{i\psi} & 0 & \cdots & 0 \\ 0 & 0 & e^{i2\psi} & \cdots & 0 \\ \vdots & \vdots & \vdots & & \vdots \\ 0 & 0 & 0 & \cdots & e^{i(N-1)\psi} \end{bmatrix}$$

$$U_1 \begin{bmatrix} h_1 \\ h_2 \\ h_3 \\ \vdots \\ h_N \end{bmatrix}$$

where GFAC is a gain factor greater than unity, $\psi$ is a phase shift angle, and $h_1, h_2, \ldots h_N$ are the eigenvectors of H ordered such that the associated eigenvalues are monotically increasing. Antenna element signals V are then transformed according to the equation $X = UV$.

6 Claims, 5 Drawing Figures

CONVERGENCE RATE IMPROVEMENT FOR ADAPTIVE RECEIVING ARRAY ANTENNAS OF HIGHER ORDER THAN 2-PULSE MTI CANCELLERS

BACKGROUND OF THE INVENTION

This invention relates to a method and apparatus for adaptive receiving array antennas for moving-target-indicating (MTI) systems, such as in airborne radar or sonar systems, and more particularly to a method and apparatus for improving the convergence rate of adaptive receiving array antenna systems having cancellers of higher orders than a two-pulse canceller.

In a copending application Ser. No. 179,777 filed on Sept. 13, 1971 by the same inventors and titled ADAPTIVE RECEIVING ARRAY ANTENNA METHODS AND APPARATUS FOR MTI SYSTEMS, a method of adaptive signal processing in airborne search radar and the like is described. That method employs adaptive control loops for producing complex weights $W_{nk}$ where n denotes the $n^{th}$ antenna element channel from 1 to N and $k$ denotes the $k^{th}$ pulse of a set of K consecutive samples obtained from each of the N array elements. These KN coherent samples (both amplitude and phase information is retained) of the radar return, Vnle, are multiplied by the adaptively controlled complex weights and added to obtain the output $V_\Sigma$ for the corresponding range resolution cell.

The set of complex weights $\{W_{nk}\}$ are produced by adaptive control loops which are identical except for differences in the steering signals. Steering signals for a K pulse system, matched to a target doppler frequency $f_1$ are $$S_{nk} = e^{-2\pi i f_1 k t} \quad \begin{array}{l} n=1,2\ldots N \\ k=1,2\ldots k \end{array} \quad (1)$$

when the main beam scan angle is normal to the linear array antenna. At other scan angles a phase gradient is introduced along the array appropriate to the desired scan angle. In a two-pulse (K=2) MTI radar system with the line of sight (antenna axis) normal to the platform velocity, the set $\{W_{nk}\}$ is formed adaptively with the steering signals $S^*_{n1} = 1$, $S^*_{n2} = -1$ ($n=1, 2 \ldots N$). The corresponding steering signals for a three-pulse ($K = 3$) MTI system are $S^*_{n1} = 1$, $S^*_{n2} = -1$ and $S^*_{n3} = 1$. At other angles, the $S^*_{nk}$ are matched to a target moving $\lambda/4$ radially between pulses.

It was found that excellent MTI gain can be achieved for all scan angles. However, in many cases of interest, the convergence rate of the adaptive system is too slow. A highly effective means for speeding convergence in a two-pulse system is described in the aforesaid copending application. It would be desirable to provide an equally effective means for speeding convergence in a higher order pulse system.

Briefly, the invention of the aforesaid copending application is embodied in a coherent pulsed airborne radar system. A separate coherent output is available from each of N elements of a linear array, where an element may be a single slot or dipole, or plurality of slots or dipoles combined in a conventional manner. A set of NK coherent returns or samples are multiplied by adaptively controlled complex weights and added to obtain the output for the corresponding range resolution cell. To accomplish that, each of the NK samples is coupled to a summing means by an adaptive loop. The output of the summing means is given by $$V_\Sigma = \sum_{n=1}^{N} \sum_{k=1}^{K} W_{nk} V_{nk} \quad (2)$$

where $W_{nk}$ is the weight applied to the $n^{th}$ element for the $k^{th}$ pulse of the train, and $V_{nk}$ is the corresponding sample of the received voltage. The steady state weights are given by $$W = (M + I/G)^{-1} S^* \quad (3)$$

where $W$ denotes a column vector of the weights $W_{nk}$, $M$ is the clutter covariance matrix, I the identity matrix, $G$ the loop gain, and $S^*$ the steering vectors.

To improve the convergence rate of a two-pulse MTI system, the two outputs $V_{n1}$ and $V_{n2}$ from each antenna array element are transformed as follows:

$$X = UV \quad (4)$$

$$U = \frac{1}{\sqrt{2}} \begin{pmatrix} 1 & e^{i\psi} \\ 1 & e^{i\psi} \end{pmatrix} \quad (5)$$

$$X = \begin{pmatrix} X_{n1} \\ X_{n2} \end{pmatrix} \quad V = \begin{pmatrix} V_{n1} \\ V_{n2} \end{pmatrix} \quad (6)$$

Where $\psi = -4\pi D \cos \theta / \lambda$, D is the distance the platform moves between pulses, $\theta$ is the main beam scan angle from the radar velocity vector and $\lambda$ is the wavelength.

SUMMARY OF THE INVENTION

It has been discovered that the transformation matrix of the aforesaid copending application can be expanded from a two-pulse MTI system to a higher order K-pulse system, i.e., where $k$ is an integer greater than 2 by forming the matrix H with elements $$H_{mn} = 1 - \epsilon |m - n|^2$$

where $\epsilon = \log 1/\rho$ and $\rho$ is the correlation between successive returns. Let $h_1, h_2, h_3 \ldots h_N$ be the eigenvectors of $H$, ordered such that the associated eigenvalues are monotonically increasing. The order of the matrix is equal to the number $K$ of pulses in the higher order system. The transformation matrix $U$ has the form $$U = \begin{pmatrix} GFAC & 0 & 0 & \ldots & 0 \\ 0 & 1 & 0 & \ldots & 0 \\ 0 & 0 & 1 & \ldots & 0 \\ \vdots & & & & \vdots \\ 0 & 0 & 0 & \ldots & 1 \end{pmatrix} U_1 \begin{pmatrix} 1 & 0 & 0 & \ldots & 0 \\ 0 & e^{i\psi} & 0 & \ldots & 0 \\ 0 & 0 & e^{i2\psi} & \ldots & 0 \\ \vdots & & & & \vdots \\ 0 & 0 & 0 & \ldots & e^{i(N-1)\psi} \end{pmatrix} \quad (7)$$

$$U_1 = \begin{pmatrix} h_1 \\ h_2 \\ h_3 \\ \vdots \\ h_N \end{pmatrix} \quad (8)$$

where GFAC is a gain factor greater than unity and $\psi$ is a phase shift angle. Equation (8) indicates that the $h_n$ are rows of $U_1$. The antenna element signals $V$ are then transformed according to the equation $$X = UV \qquad (9)$$

The phase shift factor $e^{i(n-1)\psi}$ in the matrix $U$ is for scan angles other than normal to the antenna velocity vector. Different gains are employed in the different X-signal channels, either in the last stage of the transformation matrix, at the input terminals of following adaptive control loops, or in the adaptive control loops (where the gain $G$ is then made equal to $GFAC^2$). The phase shift angle $$\psi = -(4\pi D \cos \theta / \lambda) \qquad (10)$$

is a function of antenna velocity and scan angle, and is selected to cancel clutter at the center of the beam. In Equation (10), $D$ is the distance the antenna moves between pulses, $\theta$ is the scan angle relative to the antenna velocity vector, and $\lambda$ is wavelength.

DESCRIPTION OF THE PREFERRED EMBODIMENTS

Figure 1:
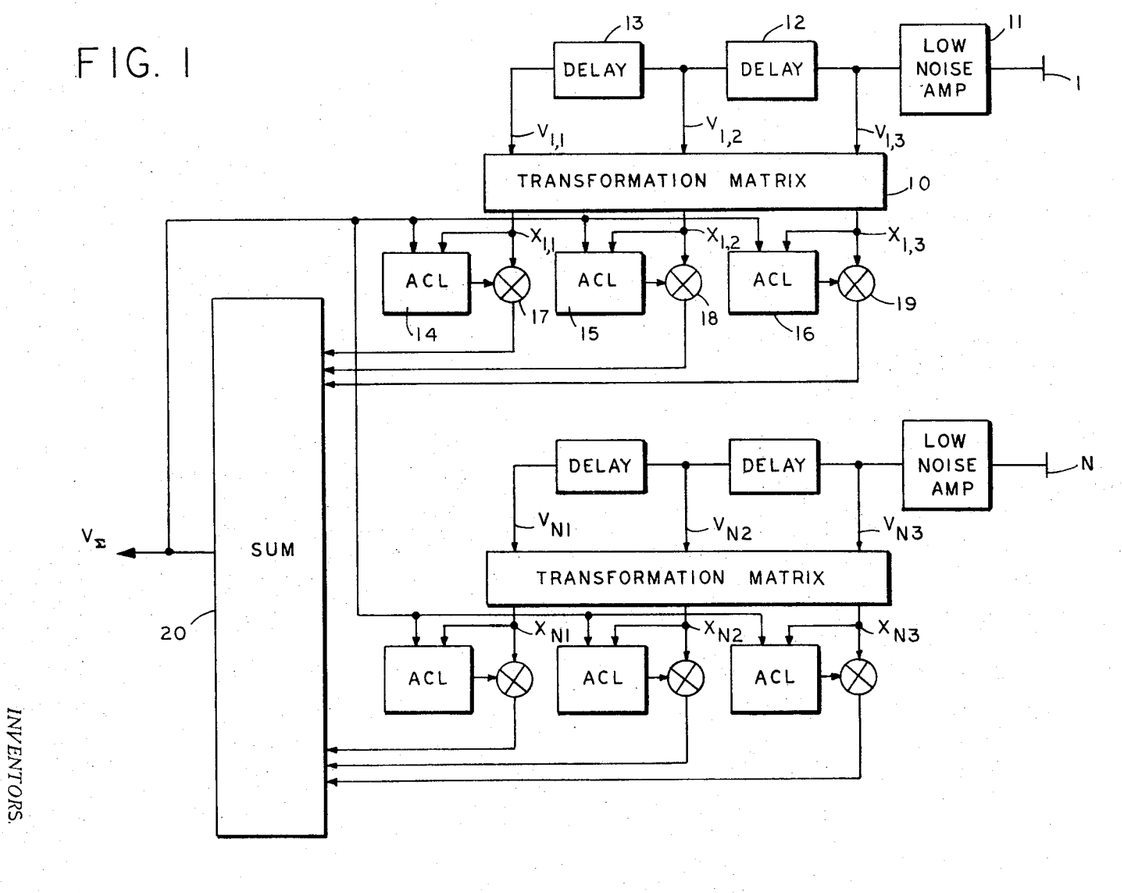
FIG. 1 is a block diagram of the present invention embodied in a three-pulse MTI radar system.

Referring now to FIG. 1, a transformation matrix 10 for improving the convergence rate of a three-pulse airborne MTI radar system is implemented according to the following equations:

$$X = UV \qquad (11)$$

$$U = \begin{pmatrix} GFAC & 0 & 0 \\ 0 & 1 & 0 \\ 0 & 0 & 1 \end{pmatrix} \begin{pmatrix} \frac{1}{\sqrt{6}} & \frac{-2e^{i\psi}}{\sqrt{6}} & \frac{e^{i2\psi}}{\sqrt{6}} \\ \frac{1}{\sqrt{2}} & 0 & \frac{-e^{i2\psi}}{\sqrt{2}} \\ \frac{1}{\sqrt{3}} & \frac{e^{i\psi}}{\sqrt{3}} & \frac{e^{i2\psi}}{\sqrt{3}} \end{pmatrix} \qquad (12)$$

$$X = \begin{pmatrix} X_{n1} \\ X_{n2} \\ X_{n3} \end{pmatrix} \quad V = \begin{pmatrix} V_{n1} \\ V_{n2} \\ V_{n3} \end{pmatrix} \qquad (13)$$

where, as noted hereinbefore, $\psi = -4\pi D \cos \theta / \lambda$ and $GFAC > 1$. It should be noted that Equations (11) to (13) are but an application of Equations (7) to (9) to the special case of a three-pulse canceller where the order of the matrix $U$ is equal to 3, and that $U$ is unitary for $GFAC = 1$, i.e. $UU^*_T = I$, the identity matrix.

The radar receiving system includes an array of N elements disposed in a line at any scan angle. Each element may be a single slot in a waveguide or a dipole, but in the normal system will be a linear array of slots or dipoles disposed in a line normal to the array of N elements and combined in a standard manner to provide a single output $V_n$, where n denotes a given one of the elements 1 to N.

Each output signal $V_n$ is transmitted through two delay elements to produce three pulses $V_{n1}$, $V_{n2}$ and $V_{n3}$ in a conventional manner for double-delay (3 pulse) MTI cancellers. In the example of FIG. 1, element 1 produces the signal $V_1$ which is amplified by a low noise amplifier 11 and transmitted through delay elements 12 and 13 to produce signals $V_{1,1}$, $V_{1,2}$ and $V_{1,3}$. These signals are then transformed by a matrix 10 into the signals $X_{1,1}$, $X_{1,2}$ and $X_{1,3}$ according to the foregoing Equations (11), (12) and (13) which, as just noted, are the special case for a three-pulse MTI canceller system derived from the general equations (7), (8) and (9). The transformation matrix 10 thus transmits the signals $X_{1,1}$, $X_{1,2}$ and $X_{1,3}$ with the following values $$X_{1,1} = (GFAC/\sqrt{6})(V_{1,1} - 2V_{1,2}e^{i\psi} + V_{1,3}e^{i2\psi}) \qquad (14)$$

$$X_{1,2} = (1/\sqrt{2})(V_{1,1} - V_{1,3}e^{i2\psi}) \qquad (15)$$

$$X_{1,3} = (1/\sqrt{3})(V_{1,1} + V_{1,2}e^{i\psi} + V_{1,3}e^{i2\psi}) \qquad (16)$$

For scan angles normal to the radar platform velocity direction, the phase shift angle $\psi$ is zero. Accordingly, the transformed signals are simply $$X_{1,1} = (GFAC/\sqrt{6})(V_{1,1} - 2V_{1,2} + V_{1,3}) \qquad (17)$$

$$X_{1,2} = (1/\sqrt{2})(V_{1,1} - V_{1,3}) \qquad (18)$$

$$X_{1,3} = (1/\sqrt{3})(V_{1,1} + V_{1,2} + V_{1,3}) \qquad (19)$$

All transformation matrices are identical and feed three adaptive control loops (ACL's), such as control loops 14, 15 and 16 which adaptively control respective complex weights $W_{n1}$, $W_{n2}$ and $W_{n3}$. All of the control loops are also identical except for steering signals $S^*_{n,k}$ as described in the aforementioned copending application.

Each output signal $X_{nk}$ of the transformation matrices is multiplied by a corresponding complex weight $W_{nk}$, such as the signals $X_{1,1}$, $X_{1,2}$ and $X_{1,3}$ multiplied by the weights $W_{1,1}$, $W_{1,2}$ and $W_{1,3}$ in respective multipliers (balanced mixers) 17, 18 and 19. The products are then summed by a summing means 20 to form an output signal $$V_\Sigma = \sum_{n=1}^{N} \sum_{k=1}^{K} W_{nk} X_{nk} \qquad (20)$$

That output signal is fed back to all of the adaptive control loops to form the set of complex weights ($W_{nk}$).

Figure 2:
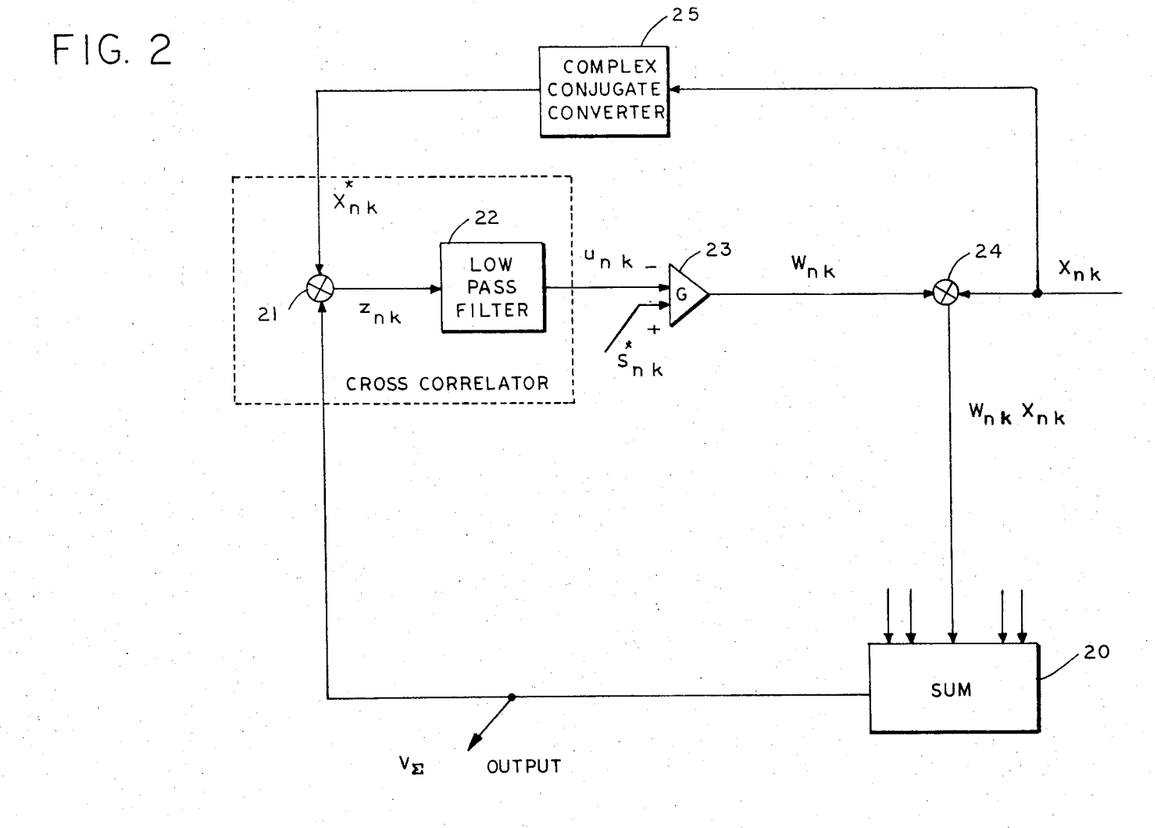
FIG. 2 is a block diagram of an adaptive control loop for use in FIG. 1.

For convenience in understanding the present invention, the adaptive control loop for a given complex weight $W_{nk}$ described in the aforementioned application is shown in FIG. 2. The control loop is comprised of a multiplier 21 and low pass filter 22 which provide a cross-correlation $u_{nk}$ between $X^*_{nk}$ and the output $V_\Sigma$. In channels where this correlation is large, the complex weight at the output of an amplifier 23 will change more rapidly than in channels of low correlation. The complex weight is formed by the amplifier 23 according to the following equation:

$$W_{nk} = (S^*_{nk} - u_{nk})G \qquad (21)$$

where $G$ is a gain factor of the amplifier. The conjugate $X^*_{nk}$ is used to form the cross-correlation and is obtained from the complex conjugate converter 25. $V_\Sigma$ is derived from the signals $X_{nk}$, each multiplied by an associated weight $W_{nk}$. Accordingly, each signal $X_{nk}$ is applied to a multiplier 24 to form the product $W_{nk} X_{nk}$. The sum of the products is the outputs $V_\Sigma$.

The transformation matrices amplify the $X_{n1}$ components by a gain factor GFAC relative to the other components $X_{n2}$ and $X_{n3}$. That may be accomplished in the output stages of the transformation matrices, or in the adaptive control loops for the $X_{n1}$ components by making the gain factor G (of amplifier 23) equal to the square of the gain factor GFAC.

The signal return from a target moving at optimum radial velocity, i.e. moving at $\lambda/4$ radial motion between pulses, has the following form in V space:

$$S \propto \begin{pmatrix} 1 \\ -e^{-i\psi} \\ e^{-2i\psi} \end{pmatrix} \quad (23)$$

Accordingly, the steering signals in V space are proportional to $S^*$, and since a signal return could be transformed into the X-space system by a matrix $U$, the optimum steering signals in X space are proportional to the complex conjugate of this X-space signal vector according to the following.

$$S^* \propto \begin{pmatrix} 4GFAC/\sqrt{6} \\ 0 \\ 1/\sqrt{3} \end{pmatrix} \quad (24)$$

The transformation matrix $U$ appropriate for a three-pulse system, was found by computing the eigenvectors of the matrix $$\begin{pmatrix} 1 & 1-\epsilon & 1-4\epsilon \\ 1-\epsilon & 1 & 1-\epsilon \\ 1-4\epsilon & 1-\epsilon & 1 \end{pmatrix} \quad (25)$$

This is a reasonable form for the covariance matrix of clutter in a three-pulse MTI system. For example, if the clutter spectrum is narrow and Gaussian, this is a good approximation to the covariance matrix for a scan angle normal to the radar platform velocity vector. The eigenvectors of this matrix approach the rows of $U$ (Equation 12) for $\psi=0$ as $\epsilon \to 0$. The phasor terms were included in Equation (12) to generalize the result to an arbitrary scan angle.

Any transformation matrix could be used in place of the matrix U; the objective is to find a transformation matrix which improves performance when different gains are used in the transformed channels. Any nonsingular transformation matrix preserves all of the input information and admits any solution in transformed space which could be achieved in the original V space. The transformation matrix of Equation (12) is a good choice, since the $X_{n1}$ components contain minimum clutter and the transformation is unitary.

To reiterate, in implementing this improvement of convergence rate for the special case of a three-pulse canceller, the steps are:

1. Transform the three consecutive outputs from each array element and each range cell ($V_{n1}$, $V_{n2}$, $V_{n3}$) to ($X_{n1}$, $X_{n2}$, $X_{n3}$) using the transformation $U$ of Equation (12). The transformation includes in the formation of the $X_{n1}$ components a gain factor GFAC $>$ 1 relative to any gain factor in the formation of the $X_{n2}$ and $X_{n3}$ components.

2. Apply the quantities $X_{n1}$, $X_{n2}$, $X_{n3}$, $n=1,2 \ldots N$, to a set of 3N adaptive loops with the steering signals of Equation (24).

The output V is the weighted sum of the individual control loop inputs, as follows:

$$V_\Sigma = \sum_{n=1}^{N} [W_{n1}X_{n1} + W_{n2}X_{n2} + W_{n3}X_{n3}] \quad (26)$$

Figure 3:
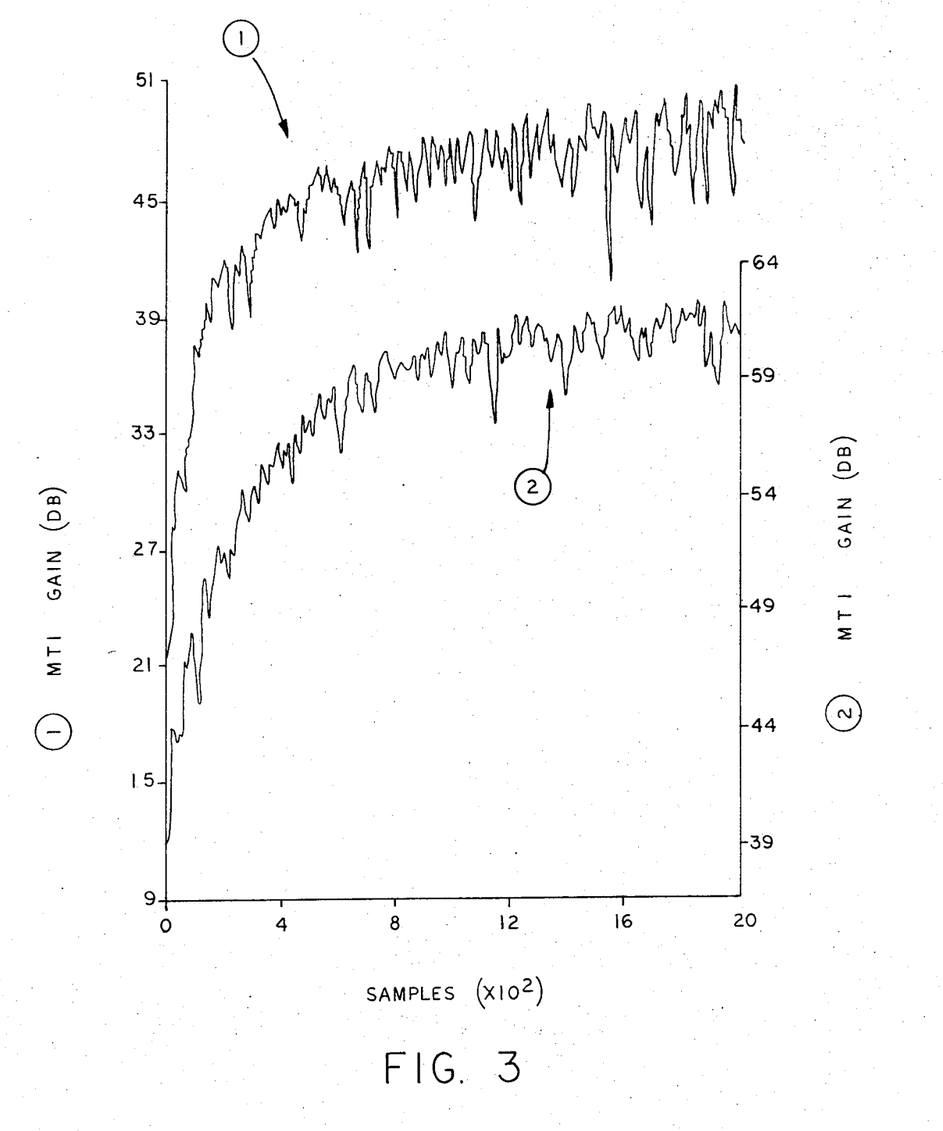
FIGS. 3 to 5 are plots of MTI gain vs. number of samples for various cases of MTI three-pulse canceller simulation with the present invention.

The space-time adaptive system according to FIG. 1 with $N=10$ was simulated. Approximately 30 cases were run to determine optimum parameters and to estimate the convergence rate improvement. Table I below lists some of the results obtained after 500 range cells of clutter and 500 adaptive loop iterations were simulated. The cases marked with an asterisk are plotted in FIGS. 3, 4 and 5, and the curves are identified by number corresponding with the lines in the table. It should be noted that the gain scale is different for each curve. The first two cases (FIG. 3) illustrates the improvement in convergence rate for an 0° scan angle, i.e., main beam oriented along the radar platform velocity vector. After 2000 samples of clutter were processed, the MTI gain increased from roughly 48 dB to 60 dB. Note that the loop time constant $\tau$ was increased (in all loops) by a factor of 3 when GFAC was 10. This increase in $\tau$ was required to maintain loop stability.

TABLE I

[Simulation results for 3-pulse array Doppler processing with convergence rate fix]

| Number | Scan angle, degrees | GFAC | 500 sample MTI gain-simulated, decibels | 500 sample MTI gain-calculated, decibels | Loop noise factor, decibels | Steady state gain, decibels | Comments |
|---|---|---|---|---|---|---|---|
| 1 | 0 | 9×10⁶ | 1 | 45.7 | 47.2 | 1.42 | 79.1 | (*) |
| 2 | 0 | 27×10⁶ | 10 | 56.1 | 58.9 | 1.38 | 101 | (*) |
| 3 | 45 | 9×10⁶ | 1 | 43.9 / 46.6 | 48.0 | 1.42 | 80.2 | (*) 2 runs with different random input. |
| 4 | 45 | 27×10⁶ | 10 | 53.9 / 56.7 | 58.2 | 1.48 | 96.0 | (*) Verified without transformation. |
| 5 | 45 | 9×10⁶ | 3 | 48.3 | 53.1 | 1.50 | 90.0 | |
| 6 | 45 | 9×10⁶ | 10 | Unstable | 59.7 | 2.46 | 96.0 | |
| 7 | 45 | 81×10⁶ | 30 | Unstable | 58.8 | 2.09 | 97.3 | |
| 8 | 45 | 162×10⁶ | 30 | 40.5 | 48.7 | 1.54 | 97.3 | |
| 9 | 45 | 9×10⁶ | 1 | 43.0 | 44.1 | 1.28 | 81.4 | 2 pulse. |
| 10 | 45 | 27×10⁶ | 10 | 47.3 | 51.5 | 1.62 | 87.3 | Do. |
| 11 | 45 | 9×10⁶ | 10 | Unstable | 53.2 | 2.86 | 87.3 | Do. |
| 12 | 90 | 9×10⁶ | 1 | 47.7 | 51.2 | 1.42 | 87.2 | (*) |
| 13 | 90 | 27×10⁶ | 10 | Unstable | 59.7 | 1.93 | 93.7 | (*) |
| 14 | 90 | 54×10⁶ | 10 | 55.7 | 58.7 | 1.47 | 93.7 | (*) |

*Cases shown in plots.
 8 elements.
 Loop gain=100.
 0.3λ motion between pulses.

Figure 4:
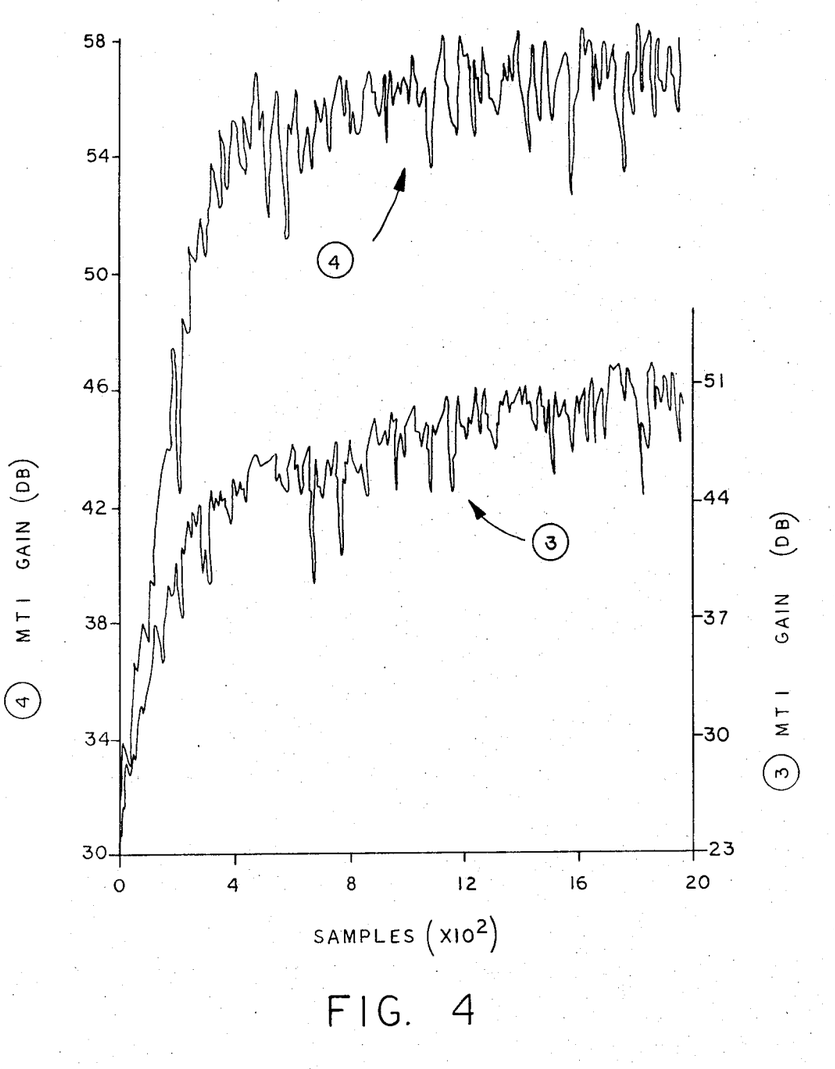

FIG. 4 shows the respective simulation results obtained with and without the transformation for a 45° scan angle. The MTI gain after 2000 loop iterations is improved from roughly 49 dB to 57 dB by the transformation matrix. The improvement after 500 iterations is approximately 10 dB. This 500-iteration figure is significant in these examples since the parameters GFAC and $\tau$ were selected emperically based on 500-sample simulation runs.

Figure 5:
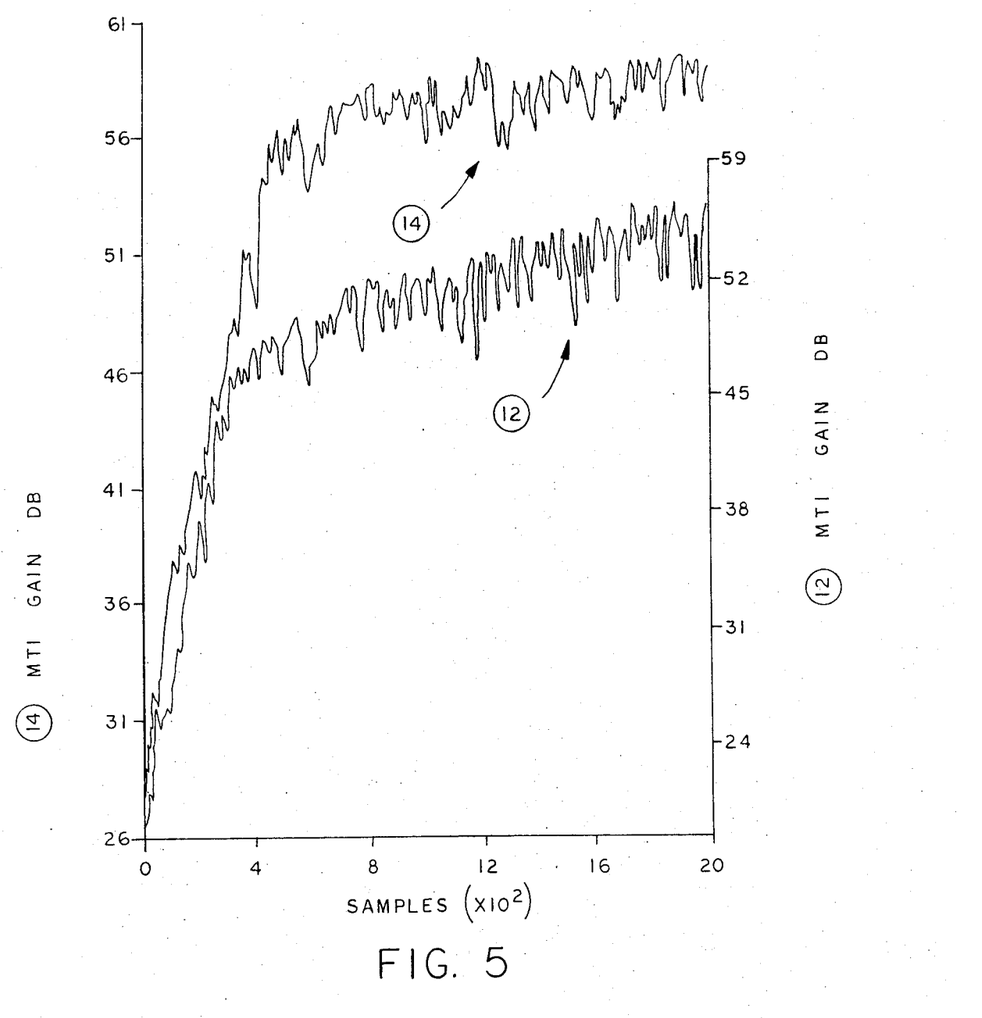

The improvement for the cases of Nos. 12 and 14 with a 90° scan angle is illustrated in FIG. 5. The MTI gain increases from roughly 54 dB to 58 dB after 2000 iterations due to the convergence rate improvement produced by the transformation matrices. The improvement after 500 iterations (again, the point for which parameters were selected) is 8 dB.

In each of the cases simulated, the antenna platform motion between pulses was 0.3λ. For the assumed eight-element array, this corresponds to about 0.075 antenna lengths of motion between pulses. This is a larger interpulse motion (higher radar platform velocity in terms of radar wavelength) than in the simulation of a two-pulse system with the transformation matrices of the aforesaid application. Three examples of two-pulse system performance are shown in cases 9, 10 and 11 of Table I for purposes of comparison. Note that 4 dB of improvement was obtained with the two-pulse system at 45° scan angle. For the same parameters, the three-pulse system provides 10 dB of MTI gain improvement after 500 loop iterations.

It appears that the effectiveness of this type of transformation matrix to improve convergence rate depends on the amount of clutter in the $X_{n1}$ outputs. The two-pulse system is less effective in reducing the $X_{n1}$ clutter than the three-pulse system. This suggests that, for small interpulse motions, the two-pulse system of the aforesaid application will provide good transient response. As the interpulse motion increases, three consecutive pulses must be processed in transformed space with different gains to achieve good transient response. At even higher interpulse motions, a larger number of pulses may be required to make this particular type of transformation useful.

The simulation was run without the transformation to X space for one case and gave results identical to the GFAC = 1 case in X space. This correspondence would be expected and serves as a check on the simulation program.

The loop noise factor is shown for each of the cases listed in Table I. This is the factor by which the loop noise increases the total output noise power under steady-state conditions. The calculated transient response and steady-state MTI gain are also shown for each case in Table I. The steady-state MTI gain improves for GFAC >1 since the bias error is reduced. This bias error results from the I/G term in $W = (M+I/G^{-1}S^*$, for the steady state weights where W denotes a column vector of the weights $W_{nk}$, M is the clutter covariance matrix, I the identity matrix, G the control loop gain, and S* the steering vectors.

The eigenvalue of Equation 25 associated with the first row of Equation 12 is very small as $\epsilon \to 0$; that associated with the second row is intermediate; and the eigenvalue of the third eigenvector (row) is large. This suggests using a gain greater than unity in both the $X_{n1}$ and $X_{n2}$ channels, with larger gain in $X_{n1}$ channels. This was tried in two runs with no improvement over the cases shown in Table I. In one case, the $X_{n1}$ and $X_{n2}$ channel gains were adjusted so that all diagonal elements of the resulting 3N × 3N covariance matrix were approximately the same. A gain of 6 was used in the $X_{n1}$ channels and of 3.4 in the $X_{n2}$ channels to equalize all diagonal elements. At 45° scan angle and a loop noise factor of 1.57, the 500-sample MTI gain was only 51.6 dB. This is not as good as the result shown for the same case in FIG. 4.

From the foregoing, it is evident that the convergence rate of an MTI canceller can be improved by a transformation matrix of a higher order than a two-pulse canceller. The example of a three-pulse (double-delay) canceller given by Equations (11) to (13) or (14) to (16) serves to illustrate the method and apparatus. The apparatus would, of course consist of means for phase shifting the signals $V_{n2}$ and $V_{n1}$, by angles $\psi$ and $2\psi$, respectively, and a plurality of adders, subtractors and multipliers for carrying out the arithmetic operations indicated by those equations. The gain factor GFAC may be introduced in the output stage of the transformation matrix, or as a gain G in the adaptive control loops, where $G = GFAC^2$. For higher order cancellers, similar transformation matrices produced according to the Equations (7) to (9) are used. Digital, analog or hybrid (digital-analog) techniques may be employed in the implementation of the matrices for any order.

What is claimed is:

1. A method for improving the convergence rate of adaptive receiving antenna systems for moving target indication from signal return in which NK samples of signal return are received, retaining both amplitude and phase information in each sample, where N is the number of receiving elements in an antenna array from one to any integer greater than one, and K is a number of consecutive samples from each array element and each range cell from three to any integer greater than three for a pulse cancellation of higher order than two pulses, and in which each of said NK samples is multiplied by adaptively controlled complex weights $W_{nk}$ before summing samples to obtain an output according to the equation $$V_z = \sum_{n=1}^{N} \sum_{k=1}^{K} W_{nk} X_{nk}$$

where $W_{nk}$ is said complex weight applied as a multiplier to the $k^{th}$ return of the $n^{th}$ element after transforming element signals from $V$ space to $X$ space before multiplication by said weights $W_{nk}$ according to the equation $$X = UV$$

where $U$ is a transformation matrix having the form $$U = \begin{pmatrix} GFAC & 0 & 0 & \cdots & 0 \\ 0 & 1 & 0 & \cdots & 0 \\ 0 & 0 & 1 & \cdots & 0 \\ \vdots & & & & \vdots \\ 0 & 0 & 0 & \cdots & \end{pmatrix} U_1 \begin{pmatrix} 1 & 0 & 0 & \cdots & 0 \\ 0 & e^{i\psi} & 0 & \cdots & 0 \\ 0 & 0 & e^{i2\psi} & \cdots & 0 \\ \vdots & & & & \vdots \\ 0 & 0 & 0 & \cdots & e^{i(N-1)\psi} \end{pmatrix}$$

$$U_1 \begin{pmatrix} h_1 \\ h_2 \\ h_3 \\ \vdots \\ h_N \end{pmatrix}$$

where GFAC > 1, $\psi$ is a phase shift angle, and $h_1, h_2 \ldots h_N$ are the eigenvectors of H ordered such that the associated eigenvalues are monotically increasing, and H is a matrix formed with elements $$H_{mn} = 1 - \epsilon |m - n|^2$$

where $\epsilon = \log 1/\rho$ and $\rho$ is the correlation between successive returns, thus indicating that the $h_n$ are rows of $U_1$, and where the phase shift factor $e^{i(n-1)\psi}$ in the matrix U is for scan angles other than normal to the antenna velocity vector, and the phase shift angle $\psi$ is equal to $-4\pi D \cos \theta/\lambda$, where $D$ is the distance the antenna moves between pulses transmitted for the antenna to receive as return signals, $\theta$ is the antenna scan angle relative to the antenna velocity vector, and $\lambda$ is wavelength of the transmitted signal, and forming said complex weights $W_{nk}$ from said output $V_\Sigma$ obtained by summing products $W_{nk} X_{nk}$ and transformed signals $X_{nk}$.

2. A method for improving the convergence rate of adaptive receiving antenna systems for moving target indication from return signals according to claim 1 using a double-delay canceller wherein $K$ is equal to three, whereby $U$ is the transformation matrix having the form $$U = \begin{pmatrix} GFAC & 0 & 0 \\ 0 & 1 & 0 \\ 0 & 0 & 1 \end{pmatrix} \begin{bmatrix} 1 & -2e^{i\psi} & e^{i2\psi} \\ \frac{1}{\sqrt{6}} & \frac{1}{\sqrt{6}} & \frac{1}{\sqrt{6}} \\ \frac{1}{\sqrt{2}} & 0 & \frac{e^{i2\psi}}{\sqrt{2}} \\ \frac{1}{\sqrt{3}} & \frac{e^{i\psi}}{\sqrt{3}} & \frac{e^{i2\psi}}{\sqrt{3}} \end{bmatrix}$$

$$X = \begin{pmatrix} X_{n1} \\ X_{n2} \\ X_{n3} \end{pmatrix} \quad V = \begin{pmatrix} V_{n1} \\ V_{n2} \\ V_{n3} \end{pmatrix}$$

3. A method as defined in claim 2 wherein said scan angle $\theta$ is 90° relative to the direction of motion, whereby transformed signals $X_{n1}, X_{n2}$ and $X_{n3}$ are computed according to the following equations:

$$X_{n1} = (GFAC/\sqrt{6})(V_{n1} - 2V_{n2} + V_{n3})$$

$$X_{n2} = (1/\sqrt{2})(V_{n1} - V_{n3})$$

$$X_{n3} = (1/\sqrt{3})(V_{n1} + V_{n3})$$

4. Apparatus for improving the convergence rate of an adaptive receiving antenna system for moving-target indication from a transmitted signal return, in which system $NK$ samples $V_{nk}$ of signal return are received, where $N$ is the number of receiving elements in an antenna array from one to any integer greater than one, and $K$ is a number from three to any integer greater than three of consecutive samples from each array element and each range cell, and in which each of said samples $V_{nk}$ is multiplied by adaptively controlled complex weights $W_{nk}$ before summing to obtain an output according to the equation $$V_\Sigma = \sum_{n=1}^{N} \sum_{k=1}^{K} W_{nk} V_{nk}$$

where $W_{nk}$ is said complex weight applied as a multiplier to the $k^{th}$ return of the $n^{th}$ element comprised of means for transforming $K$ consecutive outputs $V_{nk}$ from each array element and each range cell according to the equation $$X = UV$$

where $U$ is a transformation matrix having the form $$U = \begin{bmatrix} GFAC & 0 & 0 & \ldots & 0 \\ 0 & 1 & 0 & \ldots & 0 \\ 0 & 0 & 1 & \ldots & 0 \\ \vdots & & & & \vdots \\ 0 & 0 & 0 & \ldots & 1 \end{bmatrix} U_1 \begin{bmatrix} 1 & 0 & 0 & \ldots & 0 \\ 0 & e^{i\psi} & 0 & \ldots & 0 \\ 0 & 0 & e^{i2\psi} & \ldots & 0 \\ \vdots & & & & \vdots \\ 0 & 0 & 0 & \ldots & e^{i(N-1)\psi} \end{bmatrix}$$

$$U_1 \begin{pmatrix} h_1 \\ h_2 \\ h_3 \\ \vdots \\ h_N \end{pmatrix}$$

where $GFAC > 1$, $\psi$ is a phase shift angle, and $h_1, h_2 \ldots h_N$ are the eigenvectors of H ordered such that the associated eigenvalues are monotonically increasing, and H is a matrix formed with elements.

$$H_{mn} = 1 - \epsilon |m - n|^2$$

where $\epsilon = \log 1/\rho$ and $\rho$ is the correlation between successive returns, thus indicating that the $h_n$ are rows of $U_1$, and where the phase shift factor $e^{i(n-1)\psi}$ in the matrix $U$ is for scan angles other than normal to the antenna velocity vector, and the phase shift angle $\psi$ is equal to $-4\pi D \cos \theta/\lambda$, where $D$ is the distance the antenna moves between pulses transmitted for the antenna to receive as return signals, $\theta$ is the antenna scan angle relative to the antenna velocity vector, and $\lambda$ is wavelength of the transmitted signal, and forming said complex weights $W_{nk}$ from said output $V_\Sigma$ obtained by summing products $W_{nk} X_{nk}$ and transformed signals $X_{nk}$, means for forming said complex weights $W_{nk}$ from outputs $X_{nk}$ from said transformation matrix and said output $V$, means for multiplying outputs $X_{nk}$ from said transformation means by respective weights $W_{nk}$ to form products $W_{nk} X_{nk}$, and means for summing said products to form said output $V$ according to the equation $$V_\Sigma = \sum_{n=1}^{N} \sum_{k=1}^{K} W_{nk} X_{nk}$$

5. Apparatus as defined in claim 4 wherein $K$ is equal to three for a double-delay canceller, whereby $U$ is the transformation matrix having the form $$U = \begin{pmatrix} GFAC & 0 & 0 \\ 0 & 1 & 0 \\ 0 & 0 & 1 \end{pmatrix} \begin{bmatrix} 1 & -2e^{i\psi} & e^{i2\psi} \\ \frac{1}{\sqrt{6}} & \frac{1}{\sqrt{6}} & \frac{1}{\sqrt{6}} \\ \frac{1}{\sqrt{2}} & 0 & \frac{e^{i2\psi}}{\sqrt{2}} \\ \frac{1}{\sqrt{3}} & \frac{e^{i\psi}}{\sqrt{3}} & \frac{e^{i2\psi}}{\sqrt{3}} \end{bmatrix}$$

$$X \begin{pmatrix} X_{n1} \\ X_{n1} \\ X_{n3} \end{pmatrix} V \begin{pmatrix} V_{n1} \\ V_{n2} \\ V_{n3} \end{pmatrix}$$

6. Apparatus as defined in claim 5 wherein said scan angle $\theta$ is 90° relative to direction of motion whereby transformed signals $X_{n1}$, $X_{n2}$ and $X_{n3}$ are computed according to the following equations:

$$X_{n1} = (GFAC/\sqrt{6})(V_{n1} - 2V_{n2} + V_{n3})$$

$$X_{n2} = (1/\sqrt{2})(V_{n1} - V_{n3})$$

$$X_{n3} = (1/\sqrt{3})(V_{n1} + V_{n2} + V_{n3})$$

* * * * *